(12) United States Patent
Morina et al.

(10) Patent No.: US 11,655,789 B2
(45) Date of Patent: May 23, 2023

(54) METHOD OF CONTROLLING A PICKUP MANOEUVRE OF A HYBRID VEHICLE

(71) Applicant: C.R.F. Società Consortile per Azioni, Orbassano (IT)

(72) Inventors: Dario Morina, Orbassano (IT); Dario Del Pin, Orbassano (IT); Simone Martina, Orbassano (IT); Emanuel Corigliano, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 366 days.

(21) Appl. No.: 16/923,153

(22) Filed: Jul. 8, 2020

(65) Prior Publication Data

US 2021/0008973 A1 Jan. 14, 2021

(30) Foreign Application Priority Data

Jul. 10, 2019 (EP) .................................... 19185405

(51) Int. Cl.
*F02N 11/08* (2006.01)
*B60W 10/02* (2006.01)
(Continued)

(52) U.S. Cl.
CPC .............. *F02N 11/08* (2013.01); *B60W 10/02* (2013.01); *B60W 10/06* (2013.01); *B60W 10/08* (2013.01);
(Continued)

(58) Field of Classification Search
CPC ....... F02N 11/08; B60W 10/02; B60W 10/06; B60W 10/08; B60W 20/40;
(Continued)

(56) References Cited

U.S. PATENT DOCUMENTS

| 6,432,023 B1 | 8/2002 | Ahner et al. |
| 2011/0087394 A1* | 4/2011 | Shimanaka .......... B60W 10/115 903/902 |

(Continued)

FOREIGN PATENT DOCUMENTS

| DE | 102007049137 A1 | 4/2009 |
| DE | 102009000720 A1 | 8/2010 |
| GB | 2413998 A | 11/2005 |

OTHER PUBLICATIONS

European Search Report dated Oct. 18, 2019. 3 pages.

*Primary Examiner* — Richard W Ridley
*Assistant Examiner* — Aimee Tran Nguyen
(74) *Attorney, Agent, or Firm* — RMCK Law Group PLC

(57) ABSTRACT

A method of controlling a pickup manoeuvre of a hybrid vehicle is actuated with an engine off, an electric motor active and a first clutch being open. In a first phase of the manoeuvre, vehicle advancement is obtained by progressively closing the second clutch so that the input shaft is set in rotation with an increasing speed, while the motor rotates at an increasing speed higher than a speed of the input shaft with the second clutch in a slip condition. Upon a request for starting the engine, the first clutch is progressively closed so that the engine starts to be driven by the motor, while the second clutch is kept in the slip condition, which is maintained until the engine and motor rotate substantially at a same speed, higher than the speed of the input shaft, and once this condition is reached, closing of the second clutch is started.

7 Claims, 3 Drawing Sheets

(51) Int. Cl.
*B60W 10/06* (2006.01)
*B60W 10/08* (2006.01)
*B60W 20/40* (2016.01)
*B60W 30/18* (2012.01)
*F16D 48/08* (2006.01)

(52) U.S. Cl.
CPC ...... B60W 20/40 (2013.01); B60W 30/18027 (2013.01); *B60W 2540/10* (2013.01); *B60W 2710/025* (2013.01); *B60W 2710/081* (2013.01); *F16D 48/08* (2013.01)

(58) Field of Classification Search
CPC ....... B60W 30/18027; B60W 2540/10; B60W 2710/081; B60W 2710/025
See application file for complete search history.

(56) References Cited

U.S. PATENT DOCUMENTS

| | | | | |
|---|---|---|---|---|
| 2011/0120790 | A1* | 5/2011 | Allgaier | B60W 10/02 180/65.265 |
| 2013/0296104 | A1* | 11/2013 | Nefcy | B60W 10/026 903/902 |
| 2015/0298690 | A1* | 10/2015 | Onouchi | B60L 50/16 180/65.265 |
| 2016/0059846 | A1* | 3/2016 | Wang | B60W 10/02 180/65.265 |

\* cited by examiner

METHOD OF CONTROLLING A PICKUP MANOEUVRE OF A HYBRID VEHICLE

CROSS-REFERENCE TO RELATED APPLICATION

This application claims priority to European Patent Application No. 19185405.8 filed Jul. 10, 2019. The disclosure of the above application is incorporated herein by reference in its entirety.

FIELD OF THE INVENTION

The present invention relates to a method of controlling a pickup manoeuvre of a vehicle, in which the vehicle gains speed starting from a stationary or quasi-stationary condition.

The vehicle is of the type comprising a hybrid propulsion system including an in-series arrangement including an internal combustion engine (also referred to as combustion engine in the present description), a first clutch, an electric motor, a second clutch and a gearbox having an input shaft and an output shaft connected to the drive wheels of the vehicle.

The first clutch is arranged between the internal combustion engine and the electric motor, and the second clutch is arranged between the electric motor and the input shaft of the gearbox.

PRIOR ART

In the hybrid propulsion systems of the type described above, a pickup manoeuvre (such as, for instance, a standing start) is typically actuated by exploiting the propulsion provided by the electric motor only.

Therefore, during execution of a pickup manoeuvre, the combustion engine is turned off, the first clutch is open, the electric motor is active and the second clutch is completely closed.

Even in the case of a pickup manoeuvre actuated starting from a stationary condition of the vehicle, the second clutch is not set in a slip condition, insofar as it is exploited the capability of the electric motor of delivering torque to the drive wheels of the vehicle also starting from a condition in which the rotational speed of the electric motor is almost zero. In such a way, the torque delivered by the electric motor is completely transferred to the drive wheels by means of the second clutch (completely closed) and the gearbox.

In case the torque requested by the driver of the vehicle exceeds a certain threshold during the pickup manoeuvre, a start of the combustion engine may also be requested. Since the start of the combustion engine is operated by the electric motor by closing the first clutch, in the known systems the request for a start of the combustion engine may result in a temporary loss of power and/or a lag in the dynamic response of the vehicle perceived by the driver.

OBJECT OF THE INVENTION

The object of the present invention is to provide a method of controlling a pickup manoeuvre of a vehicle provided with a hybrid propulsion system which solves the above-mentioned technical problem. By means of the invention it is thus possible to actuate a pickup manoeuvre of a hybrid vehicle which allows starting the combustion engine without causing losses of power and/or lags in the dynamic response of the vehicle perceivable by the driver.

SUMMARY OF THE INVENTION

In view of achieving this object, the present invention relates to a method of controlling a pickup manoeuvre of a vehicle provided with a hybrid propulsion system of the type indicated at the beginning of the present description, the method being characterized in that:
- the pickup manoeuvre is actuated starting from a stationary or quasi-stationary condition of the vehicle, with the combustion engine off, the electric motor active and the first clutch in an open condition,
- in a first phase of the pickup manoeuvre, advancement of the vehicle is obtained by progressively closing the second clutch so that the input shaft of the gearbox is set in rotation with an increasing rotational speed, while the electric motor also rotates at an increasing speed, which is higher than the rotational speed of the input shaft of the gearbox at any time, with the second clutch which is in a slip condition,
- upon a request for a start of the internal combustion engine, the first clutch is progressively closed so that the internal combustion engine starts to be driven by the electric motor, while the second clutch is kept in a slip condition, and
- the slip condition of the second clutch is maintained until the internal combustion engine and the electric motor rotate substantially at a same speed, higher than the rotational speed of the input shaft of the gearbox, and once this condition is reached a closing manoeuvre of the second clutch is started.

Thanks to the above-mentioned features, the method of the invention allows to carry out the start of the combustion engine during a pickup manoeuvre of the vehicle by exploiting a slip condition of the second clutch which is pre-existing to the request for a start of the combustion engine. Thanks to such slip condition of the second clutch, the electric motor is able to deliver to the combustion engine the torque necessary for its start without negatively affecting the torque delivered to the drive wheels of the vehicle, thereby avoiding the feeling of a loss of power concurrently with the start of the combustion engine.

Moreover, thanks to the above-mentioned features, the method according to the invention provides the possibility of carrying out low-speed manoeuvres always in a homogeneous way, giving the driver always the same driving feeling.

In one embodiment of the method according to the invention, upon a request for a start of the internal combustion engine, the rotational speed of the electric motor is progressively increased with a positive gradient higher than the positive gradient of the speed of the electric motor before the generation of the request for a start of the internal combustion engine.

One embodiment of the method according to the invention comprises determining a value of torque requested by the driver of the vehicle as a function of the position of the accelerator pedal, and generating a request for a start of the internal combustion engine as a result of the value of torque requested by the driver being higher than the torque deliverable by the electric motor.

In one embodiment of the method according to the invention, in parallel with the start of the internal combustion engine the gearbox is activated to actuate a gear shift.

In an example, the gearbox comprises a first input shaft and a second input shaft, and two clutches associated to the first input shaft and the second input shaft, respectively, are arranged between the electric motor and the gearbox.

One or more embodiments relate to a corresponding hybrid propulsion system for a vehicle, comprising at least one electronic control unit of the propulsion system configured for actuating the method of the invention.

One or more embodiments relate to a corresponding vehicle comprising said hybrid propulsion system for a vehicle.

BRIEF DESCRIPTION OF THE DRAWINGS

Further characteristics and advantages of the invention will become apparent from the description that follows, with reference to the attached drawings, provided purely by way of non-limiting example, wherein.

DETAILED DESCRIPTION OF SOME EMBODIMENTS

Figure 1:
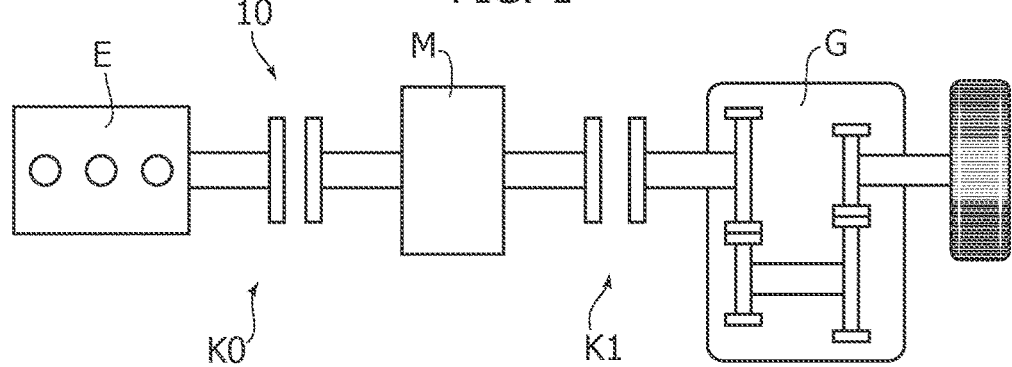
FIGS. 1 to 4 and 7 are schematic views of a hybrid propulsion system suitable for use in one or more embodiments.

In FIG. 1, the reference number 10 indicates in its entirety a hybrid propulsion system suitable for use in one or more embodiments. The hybrid propulsion system 10 includes an in-series arrangement comprising an internal combustion engine (or combustion engine) E, a first clutch K0, an electric motor M, a second clutch K1, and a gearbox G having an input shaft and an output shaft connected to the drive wheels of the vehicle. The first clutch K0 is arranged between the engine E and the motor M, and the second clutch K1 is arranged between the motor M and the input shaft of the gearbox G.

FIGS. 1 to 4 illustrate schematically the hybrid propulsion system 10 during four successive phases of a pickup manoeuvre of the vehicle actuated according to the method of the invention.

In FIG. 1, the vehicle is supposed to be in a stationary condition and both the clutches K0 and K1 are open. The combustion engine E is off, the electric motor M is activatable and the drive wheels of the vehicle are stationary.

Figure 2:
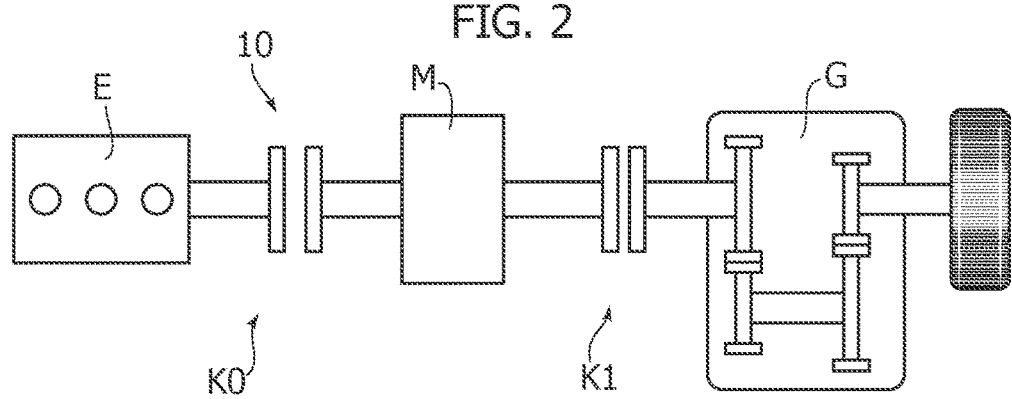

As a result of a pressure applied to the accelerator pedal, the pickup manoeuvre (i.e., a standing start) is started activating the electric motor M and bringing the second clutch K1 into a slip condition as illustrated in FIG. 2. In such a condition, the input shaft of the gearbox G is set in rotation with an increasing rotational speed, while the electric motor M also rotates with an increasing speed, which is higher than the rotational speed of the input shaft of the gearbox G at any instant. In this way, the torque delivered by the electric motor M is partially transmitted to the drive wheels of the vehicle by means of the gearbox G, thereby determining advancement of the vehicle and maintaining the electric motor M in a condition in which the difference between the torque effectively delivered to the drive wheels and the maximum torque deliverable by the electric motor M provides a "reserve" possibly usable for starting the combustion engine E without causing a decrease of the torque transmitted to the drive wheels of the vehicle.

Figure 3:
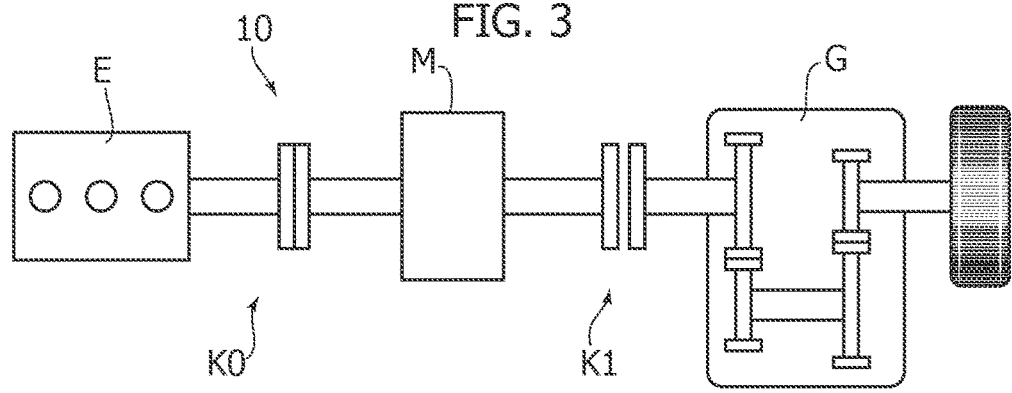

Therefore, upon a request for a start of the combustion engine E as illustrated in FIG. 3, the first clutch K0 is progressively closed so that the combustion engine E starts to be driven by the electric motor M, while the second clutch K1 is kept in a slip condition.

Figure 4:
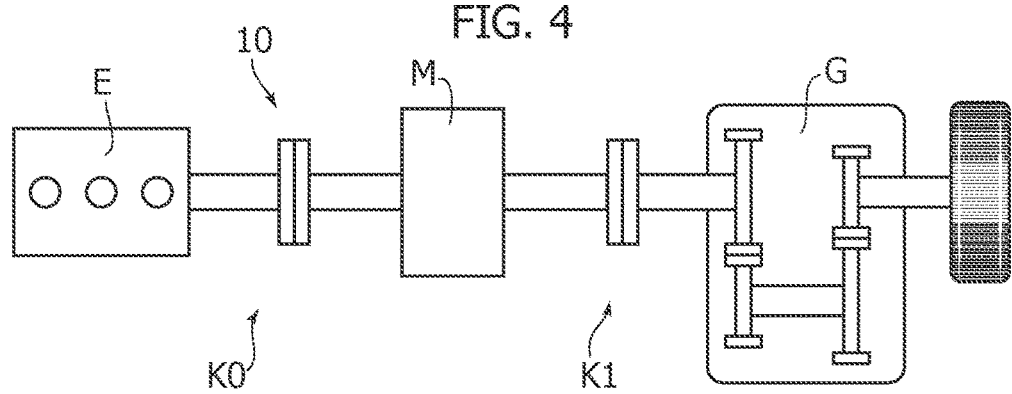

The slip condition of the second clutch K1 is maintained until the combustion engine E and the electric motor M rotate substantially at a same speed (i.e., until the first clutch K0 is completely closed), higher than the rotational speed of the input shaft of the gearbox. As illustrated in FIG. 4, once this condition is reached, a closing manoeuvre of the second clutch K1 is started so as to cause the combustion engine E, the electric motor M and the input shaft of the gearbox to rotate all at a same speed (condition of the first clutch K0 and the second clutch K1 fully closed).

Figure 5:
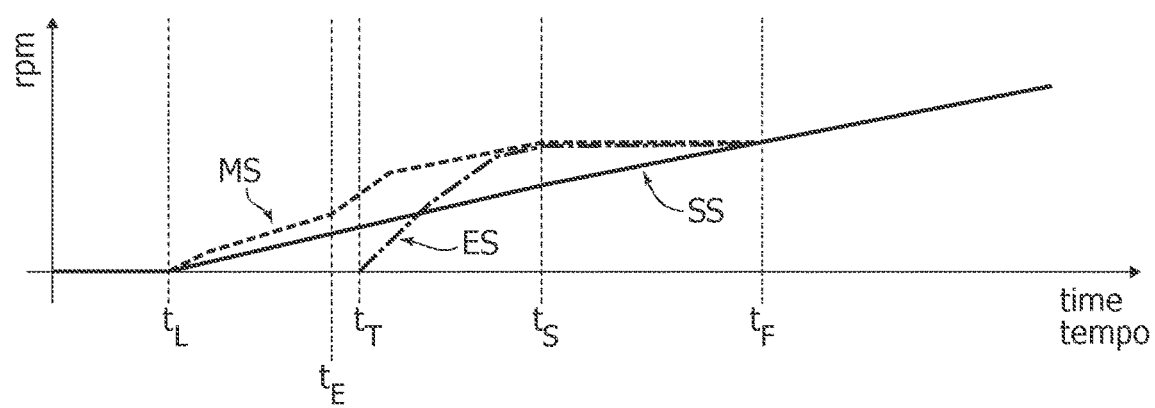
FIGS. 5 and 6 are diagrams which illustrate an exemplary embodiment of the method according to the invention.
Figure 6:
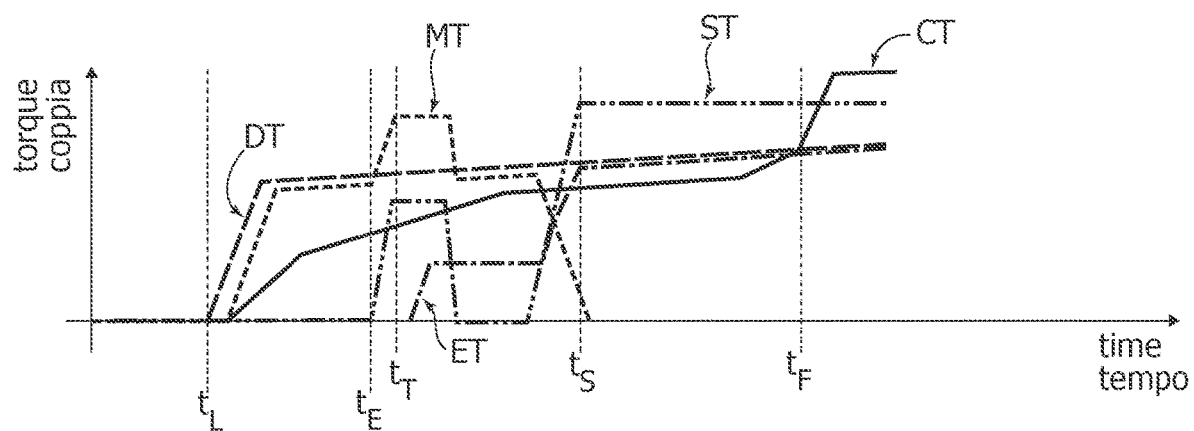

The diagrams of the FIGS. 5 and 6 illustrate the time behaviour of the following quantities during a pickup manoeuvre actuated according to the method of the invention:

MS (dot line): rotational speed of the electric motor M,
ES (dash-and-dot line): rotational speed of the combustion engine E,
SS (solid line): rotational speed of the input shaft of the gearbox,
CT (solid line): torque at the input shaft of the gearbox,
DT (dash line): torque requested by the driver,
MT (dot line): torque delivered by the electric motor M,
ET (dash-and-dot line): torque delivered by the combustion engine E, and
ST (dash-and-two-dots line): torque at the first clutch K0.

As illustrated in FIGS. 5 and 6, the vehicle is initially stationary (SS=0 rpm until instant $t_L$ and at instant $t_L$ a pickup manoeuvre is started, e.g., resulting from the pressure on the accelerator pedal by the driver. In the first phase of the pickup manoeuvre (between instants $t_L$ and $t_E$), advancement of the vehicle is obtained exclusively by means of the propulsion generated by the electric motor M, which rotates at a speed MS which is higher than the rotational speed SS of the input shaft of the gearbox since the second clutch K1 is kept in a slip condition (independently from the fact that a start of the combustion engine may be requested later), contrarily to what happens in known systems and methods.

At a certain instant $t_E$, a control unit of the hybrid propulsion system of the vehicle (HCU, Hybrid Control Unit) may request a start of the combustion engine E, e.g., because the torque requested by the driver is higher than the torque deliverable by the electric motor M only (except for any "safety margin"). In the method of the invention, start of the combustion engine E may be actuated rapidly, transferring to the combustion engine E the torque deliverable by the electric motor M which is not transferred to the drive wheels because the second clutch K1 is in a slip condition.

Therefore, the combustion engine E may be driven by the electric motor M (from instant $t_T$ in FIGS. 5 and 6) without negatively affecting the rotational speed of the input shaft of the gearbox G (and thus of the drive wheels of the vehicle). The rotational speed of the input shaft of the gearbox may keep increasing during the start phase of the combustion engine E, between instants $t_T$ and $t_S$—with the same positive gradient that it had during the first phase of the pickup manoeuvre, when the propulsion was generated by the electric motor M only (between instants $t_L$ and $t_T$).

Once the phase of starting the combustion engine E (instant $t_S$) is terminated, i.e., when the first clutch K0 is completely closed and the combustion engine E and the electric motor M rotate substantially at the same speed, the second clutch K1 is completely closed (e.g., progressively, as illustrated in the time interval between instants $t_S$ and $t_F$ in FIGS. 5 and 6, i.e. modulating the slip condition of the second clutch K1 until instant $t_F$) to make the combustion engine E, the electric motor M and the input shaft of the gearbox G rotate substantially at the same speed (instant $t_F$ in FIGS. 5 and 6).

In various embodiments, the hybrid propulsion system 10 may be configured for modulating the amount of torque transferred to the drive wheels of the vehicle as a function of the request of the driver (e.g., as a function of the position of the accelerator pedal) during the slip phase of the second clutch K1 (i.e., during the entire time interval between instants $t_L$ and $t_F$, or a portion thereof).

As illustrated in FIG. 5, one embodiment of the method may provide, upon a request for a start of the combustion engine E, that the rotational speed of the electric motor M is progressively increased with a positive gradient higher than the positive gradient that the speed of the electric motor M had before the generation of the request for a start of the combustion engine E.

Generally, upon a request for a start of the combustion engine E, the rotational speed of the electric motor M may be varied with the aim of reaching a value which is higher than a certain target value, with such target value being a value which allows operation of the combustion engine E (so-called "engine idle speed"). If the rotational speed of the electric motor M is equal or higher than the target value when the request for a start of the combustion engine E is generated, then the rotational speed of the electric motor M may remain unchanged.

Figure 7:
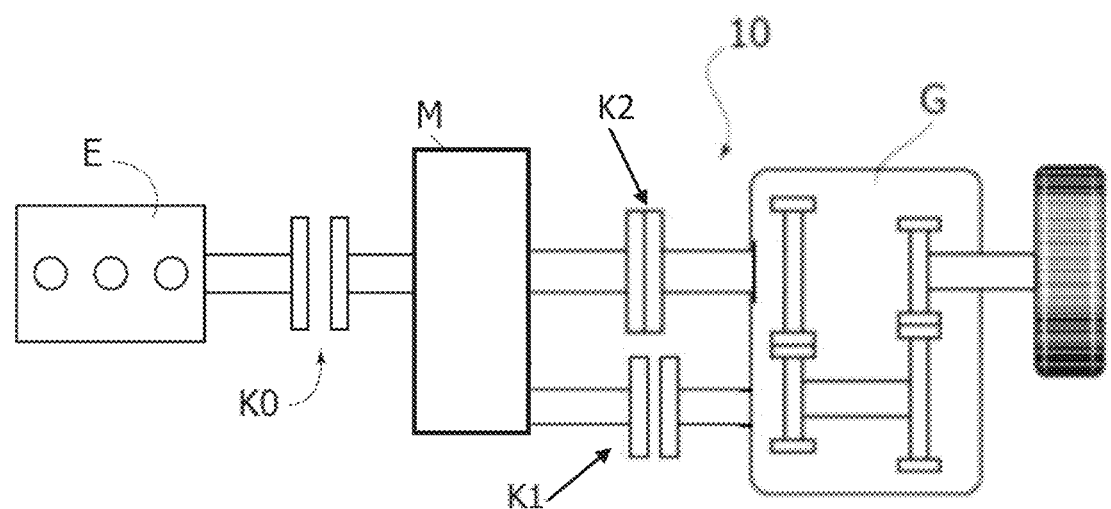

A method as described and illustrated herein may be applied also in case the gearbox G of the hybrid propulsion system comprises a first input shaft and a second input shaft with respective second clutches K1 and K2 (so-called "dual-clutch" system), as schematically shown in FIG. 7. In such case, the pickup manoeuvre is completed actuating only one of the clutches K1 and K2 (for instance, the clutch which allows putting into the first forward gear of the gearbox G), while the other clutch remains in an open condition.

In one embodiment, the gearbox G may be activated for actuating a gear shift in parallel with the start of the internal combustion engine during the pickup manoeuvre. In such case, the slip condition of the second clutch (which may be pre-existing to the request for a start of the combustion engine and to the gear shift request) may be advantageously exploited to actuate the gear shift, both in single-clutch and dual-clutch propulsion systems (i.e., propulsion systems having one or two clutches arranged between the electric motor M and the gearbox G).

A hybrid propulsion system 10 according to the invention may thus comprise one or more electronic control units configured for actuating the method described herein.

In particular, the propulsion system may comprise a transmission electronic control unit (TCU) and a hybrid system electronic control unit (HCU). The transmission electronic control unit may be configured to control the propulsion system during the first phase of the pickup manoeuvre, until instant $t_E$ when a start of the internal combustion engine E is possibly requested. The hybrid system electronic control unit may be configured to control the propulsion system during the start phase of the internal combustion engine E, until instant is when the combustion engine E is started and rotates at the same speed of the electric motor M. The last phase of the pickup manoeuvre, in which the speed of the combustion engine and of the electric motor gets synchronized with the speed of the input shaft of the gearbox G by progressively closing the second clutch K1, may be again controlled by the transmission electronic control unit.

Of course, without prejudice to the principle of the invention, the details of construction and the embodiments may vary widely with respect to those described and illustrated here purely by way of example, without departing from the scope of the present invention, as defined by the attached claims.

What is claimed is:

1. A method of controlling a pickup manoeuvre of a vehicle, wherein the vehicle gains speed starting from a stationary condition, wherein the vehicle includes a hybrid propulsion system having an in-series arrangement including an internal combustion engine, a first clutch, an electric motor, a second clutch and a gearbox having an input shaft and an output shaft connected to drive wheels of the vehicle, said first clutch being arranged between the internal combustion engine and the electric motor, and said second clutch being arranged between the electric motor and said input shaft of the gearbox, said method comprising:

the pickup manoeuvre being actuated starting from said stationary condition of the vehicle, with the internal combustion engine off, the electric motor active and said first clutch in an open condition whereby connection between the internal combustion engine and the electric motor is interrupted, in a first phase of the pickup manoeuvre, advancement of the vehicle is obtained by progressively but not completely closing the second clutch so that the input shaft of the gearbox is set in rotation with an increasing speed, while the electric motor also rotates at an increasing speed which is higher than a rotational speed of the input shaft of the gearbox at any instant with the second clutch being in a slip condition, upon a request for a start of the internal combustion engine, said first clutch is progressively closed so that the internal combustion engine starts to be driven by the electric motor, while the second clutch is kept in the slip condition so that a rotational speed of the electric motor is higher than a minimum rotational speed which allows operation of the internal combustion engine, and the slip condition of the second clutch is maintained until the internal combustion engine and the electric motor rotate substantially at a same speed, higher than the rotational speed of the input shaft of the gearbox, and once this condition is reached a closing manoeuvre of the second clutch is started to bring the internal combustion engine, the electric motor and the input shaft of the gearbox to all rotate substantially at the same speed.

2. The method of claim 1 wherein, upon the request for the start of the internal combustion engine, the rotational speed of the electric motor is progressively increased with a positive gradient higher than the positive gradient of the speed of the electric motor before generation of the request for the start of the internal combustion engine.

3. The method of claim 1, comprising:

determining a value of torque requested by a driver of the vehicle as a function at least of a position of an accelerator pedal of the vehicle, and generating said request for the start of the internal combustion engine as a result of the value of torque requested by the driver being higher than an amount of torque deliverable by said electric motor.

4. The method of claim 1, wherein in parallel with the start of the internal combustion engine, said gearbox is activated to actuate a gear shift.

5. The method of claim 4, wherein said input shaft of said gearbox comprises a first input shaft and a second input shaft, and wherein said second clutch includes two second clutches respectively associated to the first input shaft and the second input shaft and arranged between the electric motor and the gearbox.

6. A hybrid propulsion system for a vehicle including an in-series arrangement having an internal combustion engine, a first clutch, an electric motor, a second clutch and a gearbox having an input shaft and an output shaft connected to drive wheels of the vehicle, said first clutch being arranged between the internal combustion engine and the electric motor, and said second clutch being arranged between the electric motor and said input shaft of the gearbox, said hybrid propulsion system comprising:
    at least one electronic control unit of the propulsion system configured for actuating the method of claim 1.

7. A vehicle comprising a hybrid propulsion system according to claim 6.

\* \* \* \* \*